US008953768B2

(12) United States Patent
Chua et al.

(10) Patent No.: US 8,953,768 B2
(45) Date of Patent: Feb. 10, 2015

(54) CALL-HANDLING RULES

(75) Inventors: Chun Yong Chua, Redmond, WA (US);
Feroze B. Daud, Redmond, WA (US);
Michael Anthony Faoro, North Bend, WA (US); Nankang Ma, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 463 days.

(21) Appl. No.: 12/724,042

(22) Filed: Mar. 15, 2010

(65) Prior Publication Data

US 2011/0222675 A1 Sep. 15, 2011

(51) Int. Cl.
*H04M 3/42* (2006.01)
*H04M 3/436* (2006.01)
*H04L 12/66* (2006.01)
*H04M 15/06* (2006.01)

(52) U.S. Cl.
CPC ............... *H04M 3/436* (2013.01); *H04L 12/66* (2013.01); *H04M 3/42153* (2013.01); *H04M 15/06* (2013.01); *H04M 3/42059* (2013.01); *H04M 2203/2072* (2013.01)
USPC .............. 379/211.02; 379/88.14; 379/212.01; 455/417

(58) Field of Classification Search
USPC ................ 709/206; 379/88.13, 88.17, 88.14, 379/211.01, 211.02, 212.01, 221.01; 455/417
See application file for complete search history.

(56) References Cited

U.S. PATENT DOCUMENTS

| 6,477,374 | B1  |   | 11/2002 | Shaffer et al. ................. 455/445 |
|-----------|-----|---|---------|----------------------------------------|
| 6,584,490 | B1  |   | 6/2003  | Schuster et al. ............... 709/200 |
| 6,751,307 | B2  |   | 6/2004  | McAlinden ................. 379/201.2   |
| 6,847,703 | B2  | * | 1/2005  | Shibuya ..................... 379/88.14 |
| 7,305,437 | B2  |   | 12/2007 | Horvitz et al. ................ 709/204 |
| 7,602,895 | B2  |   | 10/2009 | Terry et al. ................ 379/215.01 |
| 2006/0252444 | A1 |   | 11/2006 | Ozugur .......................... 455/519 |
| 2007/0047522 | A1 |   | 3/2007  | Jefferson et al. .............. 370/352 |
| 2008/0247529 | A1 |   | 10/2008 | Barton et al. ............. 379/211.01  |
| 2009/0147937 | A1 | * | 6/2009  | Sullhan et al. ........... 379/201.02   |
| 2011/0029616 | A1 | * | 2/2011  | Wang et al. .................... 709/206 |

OTHER PUBLICATIONS

Cisco Systems, Inc.; "Cisco Unified CallConnector Mobility"; Mar. 2007; http://www.cisco.com/en/US/prod/collateral/voicesw/ps6789/ps7046/ps7274/ps7291/product_data_sheet0900aecd805d3568.pdf; 5 pgs.

* cited by examiner

*Primary Examiner* — MD S Elahee
(74) *Attorney, Agent, or Firm* — Louise Bowman; Jim Ross; Micky Minhas (57) ABSTRACT

Call-handling rules may be provided. A user interface may access a plurality of information associated with a user and provide functionality for creating a plurality of rules based on the information. An incoming call intended for the user may be received and processed according to the created rules.

21 Claims, 6 Drawing Sheets

CALL-HANDLING RULES

BACKGROUND

Call-handling rules allow processing of incoming telephone calls based on external data. In some situations, telecommunication-related services and applications, such as Centrex, PBX, voice mail systems, and unified messaging systems, provide users with the ability to create call-handling rules to dictate how incoming phone calls should be handled. For example, a user can specify all incoming calls to her work phone be transferred to her home phone between 9 a.m. to 5 p.m., Monday to Friday. However, there are problems with conventional products that offer call-handling rules. Existing products support a limited set of conditions, which restricts the usefulness of the feature and revolve mainly around the concepts of call line identity, time-of-the-day, and what phone number the caller dialed. Further, existing solutions require users to provide necessary data directly into the product itself.

SUMMARY

Call handling rules may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Call-handling rules may be provided. A user interface may access a plurality of information associated with a user and provide functionality for creating a plurality of rules based on the information. An incoming call intended for the user may be received and processed according to the created rules.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Call-handling rules may be provided. Consistent with embodiments of the present invention, call-handling rules may be made more useful by leveraging user information from various applications. For example, an availability status of the user from a messaging or calendar application, the email contacts which the user already has, and whether the user has turned on/off automatic email replies may be accessed and used to form the basis of a call-handling rule. Information used to evaluate these rules may be derived directly from the company's directory, the user's existing email, and/or calendaring applications. If there are call answering rules configured, the rules may be evaluated according to an associated priority. The highest priority rule whose conditions are met may be processed. After evaluating all the rules, if no rule's conditions are met and/or no rules are configured, the caller may be defaulted to leaving a voice mail message.

Figure 1:
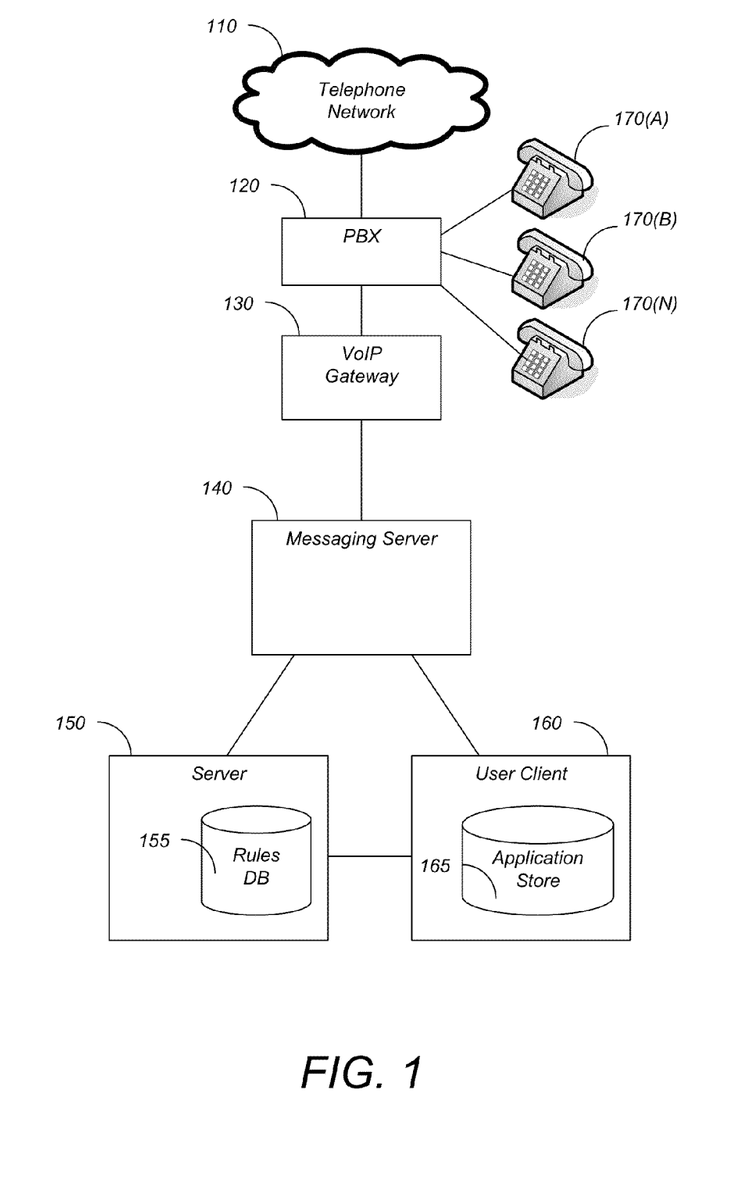
FIG. 1 is a block diagram of an operating environment.

FIG. 1 is a block diagram of an operating environment 100 for providing call-handling rules. Operating environment 100 may comprise a telephone network 110, a Private Branch Exchange (PBX) 120, a Voice over Internet Protocol (VoIP) gateway 130, a messaging server 140, a server 150 comprising a rules database 155, and a user client 160 comprising an application data store 165. Telephone network 110 may comprise, for example, a public switched telephone network (PSTN). PBX 120 may comprise a telephone exchange associated with an organization. PBX 120 may make connections among a plurality of internal telephones 170(A)-170(N) of the organization and may also connect them to the public switched telephone network (PSTN) via trunk lines. VoIP gateway 130 may translate calls between telephone network 110 and a digital network, such as for relay to messaging server 140. Messaging server 140 may comprise a unified messaging (UM) server operative to integrate different electronic messaging and communications media (e.g., e-mail, SMS, Fax, voicemail, video messaging, etc.) technologies into a single interface, accessible from a variety of different devices. Messaging server 140 may store all types of messages in one system. Voicemail messages, for example, may be delivered directly into a user's e-mail inbox and/or played through a headset or speaker associated with user client 160. Server 150 may comprise, for example, an-email server such as Exchange®, produced and distributed by Microsoft Corporation of Redmond, Wash.

Figure 2A:
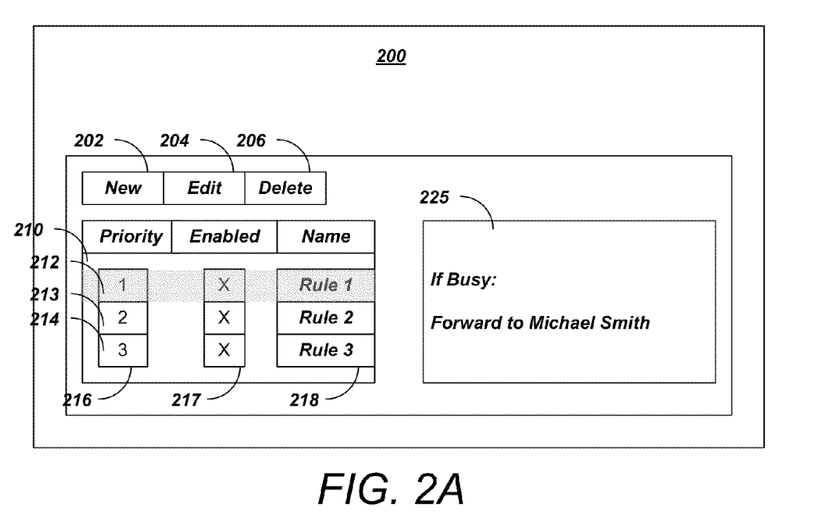
FIGS. 2A-2C are block diagrams of a user interface for creating a call handling rule.
Figure 2B:
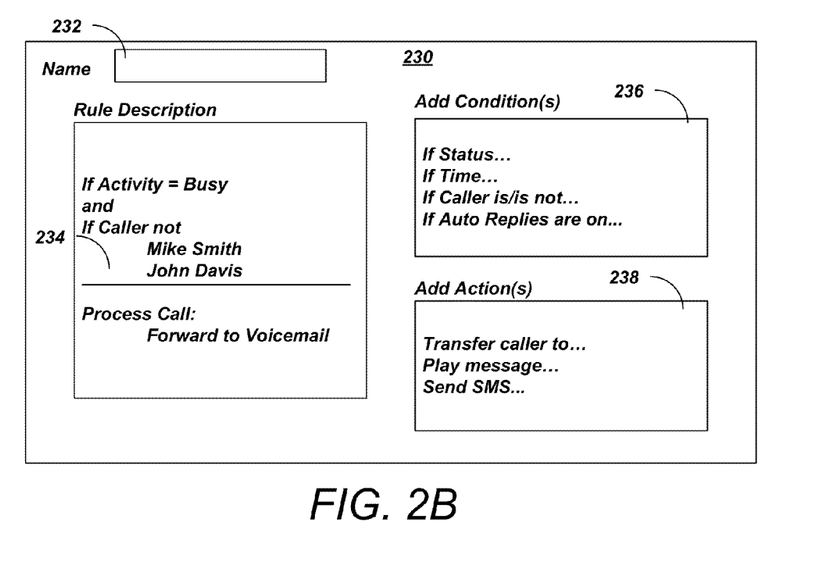
Figure 2C:
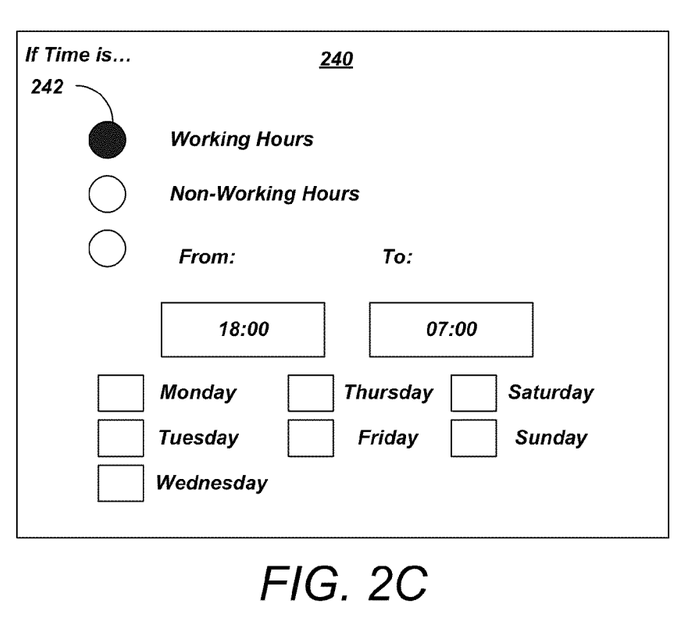

FIGS. 2A-2C are block diagrams of a user interface for providing call-handling rules. FIG. 2A is a block diagram of a main user interface 200 comprising menu items such as a new menu item 202, an edit menu item 204, and a delete menu item 206. Main user interface 200 may further comprise an existing rule list 210 comprising a selected rule 212, a second rule 213, and a third rule 214. Each rule may comprise a priority 216, an enable checkbox 217, and a rule name 218. Priority 216 may comprise, for example, a user-editable field or other control, such as up/down arrows that may change the associated rule's priority with respect to other rules. A preview area 225 may display information associated with selected rule 212.

FIG. 2B is a block diagram of a rule edit user interface 230 that may be displayed in response to a user selection of new menu item 202 and/or edit menu item 204. Rule edit user interface 230 may comprise a rule name field 232, a rule description field 234, an add condition control 236, and an add action control 238. Add condition control 236 and/or add action control 238 may each comprise selectable controls associated with modifying the rule selected for editing in main user interface 200 and/or creating a new rule.

FIG. 2C is a block diagram of an add condition dialog 240 associated with rule edit user interface 230. Add condition dialog 240 may be displayed upon selection of the "If Time . . . " condition in add condition control 236. Add condition dialog 240 may comprise a time selection list 242 allowing a user to select a working hours, non-working hours, or manual time interval condition for the rule. The manual time interval condition may comprise a user selection of a time range (e.g., 6:00 PM-9:00 PM), a date range (e.g. Jan. 1, 2010-Jan. 31, 2010), and/or one or more days of the week (e.g., Monday, Wednesday, and Friday).

Figure 3:
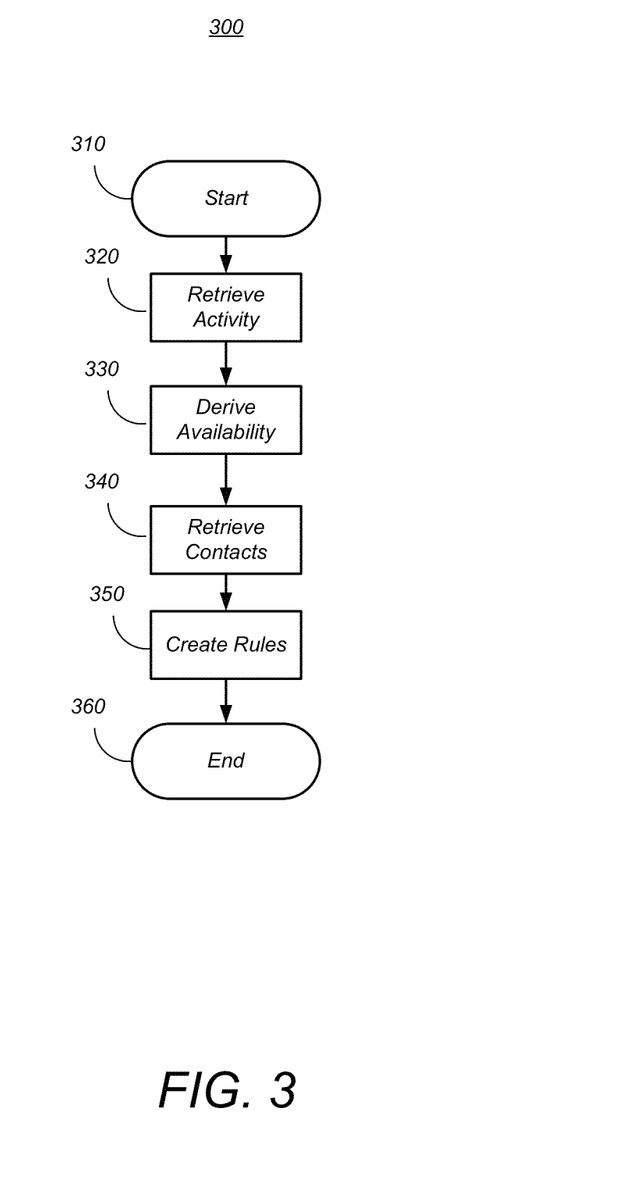
FIG. 3 is a flow chart of a method for creating call-handling rules.

FIG. 3 is a flow chart setting forth the general stages involved in a method 300 consistent with embodiments of the invention for creating call-handling rules. Method 300 may be implemented using a computing device 500 as described in more detail below with respect to FIG. 5. Ways to implement the stages of method 300 will be described in greater detail below. Method 300 may begin at starting block 310 and proceed to stage 320 where computing device 500 may retrieve a user activity. For example, a user may use main user interface 200 to begin creating a rule and may select a condition related to the user's activity in rule edit user interface 230. Main user interface 200 and/or rule edit user interface 230 may be displayed, for example on user client 160. User client 160 may retrieve one and/or more activities from the user's calendar application, such as recurring meetings, appointments, and/or user settings (e.g., normal working hours).

Method 300 may then advance to stage 330 where computing device 500 may derive an availability of the user. For example, activities on the user's calendar may each be associated with a status such as "free", "tentative", "busy", and/or "out of office". The calendar may also be used to derive the user's working hours. For example, if the user has no activities prior to 8:00 AM and nothing after 6:30 PM, the user's working hours may be derived to be from 8:00 AM-6:30 PM. The user may also have configured a setting for the calendar display such that days are displayed from 9:00 AM-6:00 PM; this setting may be used to derive the user's working hours. Time intervals within the user's working hours may be generally identified as available while time outside the working hours may be generally identified as unavailable.

From stage 330, method 300 may advance to stage 340 where computing device 500 may retrieve contacts for use as rule conditions. For example, a company directory associated with the user's organization and/or a user's personal contact list may be retrieved. The contacts may be associated with a personal information manager application, an e-mail application, and/or a database synced with the user's handheld devices, such as a personal digital assistant (PDA) and/or cellular phone.

From stage 340, method 300 may advance to stage 350 where computing device 500 may create a call-handling rule. For example, the user may begin by adding a condition to the new rule. As conditions are added, they may be displayed in rule description field 234. Conditions may comprise, for example, a caller identity, a time-of-the-day, a user availability, and a work state (e.g., whether or not the user's automatic e-mail replies are turned on). A caller-ID condition may be applied to a call-handling rule such that the rule will only be triggered if the calling party matches one of those specified. The calling party may be selected from a list of the user's contacts. The user's availability may be retrieved from the user's calendar and displayed as a selectable condition. For example, a user may set a condition for calls received during the user's attendance at a recurring event or when the user's calendar comprises an activity labeled as "busy". The time-of-the-day condition may be triggered if the time of the call matches the time period specified.

Multiple call-handling rules may be created. Each call-handling rule may be associated with one and/or more conditions, and a rule may be processed if all conditions associated with the rule are triggered. Consistent with embodiments of the invention, not all conditions may be required and/or some conditions may comprise an exclusive and/or inclusive "or" relation. For example, a rule condition may comprise a list of selected contacts associated with the rule, any of whom may match the rule condition and cause the rule to fire (e.g., if any member of the user's work team calls, trigger the rule). The rules may be enabled, disabled, and/or reordered. The actions to process the calls may also be selected based on the gathered user information. For example, the user may specify an action to forward a call to another user selected from the user's list of contacts. Method 300 may then end at stage 360.

Figure 4:
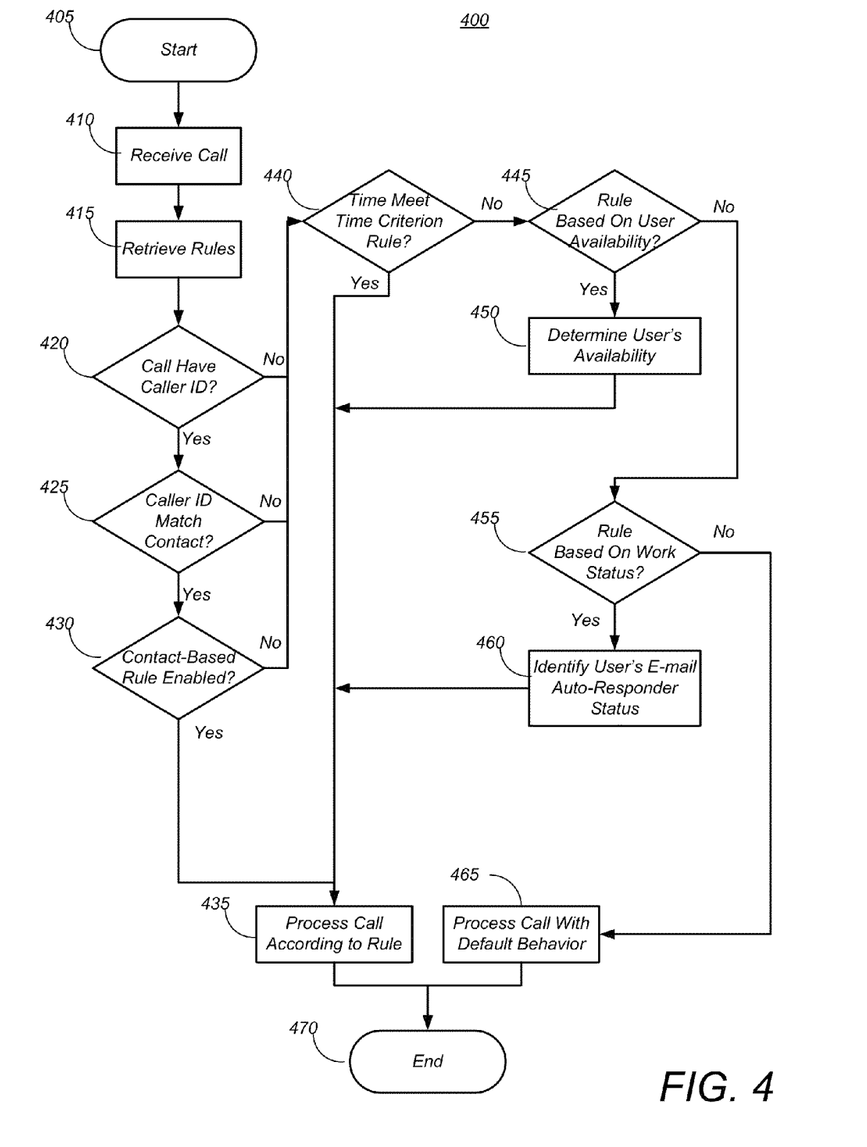
FIG. 4 is a flow chart of a method for processing call-handling rules.

FIG. 4 is a flow chart setting forth the general stages involved in a method 400 consistent with embodiments of the invention for processing call-handling rules. Method 400 may be implemented using a computing device 500 as described in more detail below with respect to FIG. 5. Ways to implement the stages of method 400 will be described in greater detail below. Method 400 may begin at starting block 305 and proceed to stage 410 where computing device 500 may receive an incoming call intended for the user. For example, a call may be received at messaging server 140 after being relayed from PBX 120.

From stage 410, method 400 may advance to stage 415 where computing device 415 may retrieve call-handling rules associated with the user. For example, messaging server 140 may retrieve the user's call-handling rules from the user's mailbox stored on server 150 and/or user client 160.

Method 400 may then advance to stage 420, where computing device 500 may determine whether the incoming call comprises a caller ID. Caller ID is a telephone service, available in analog and digital phone systems and Voice over Internet Protocol (VoIP) applications, that transmits a caller's number to the called party's telephone equipment during the ringing signal, or when the call is being set up but before the call is answered. Caller ID may also provide a name associated with the calling telephone number. The information made available to the called party may be displayed on a telephone's display or on a separately attached device.

From stage 420, method 400 may advance to stage 425 where computing device 400 may determine whether the caller ID corresponds to at least one of the user's contacts. For example, messaging server 140 may determine whether the calling party matches a contact on the user's contact lists, such as that retrieved at stage 340 of method 300, described above.

If so, method 300 may advance to stage 430 where computing device 500 may determine whether at least one of the user's call-handling rules is associated with the matching contact. For example, the call-handling rule may comprise a condition associated with the user's supervisor or spouse.

If the caller matches a contact associated with one of the rules, the call may be processed according to a rule associated with that contact. Processing the incoming call may comprise, for example, forwarding the at least one incoming call to a phone number associated with the user or another user (e.g., an assistant or operator), redirecting the at least one incoming call to a voicemail service, responding to the at least one incoming call with a pre-recorded message, and transmitting a message to the user. For example, a call may be processed according to a rule comprising a working hours time interval condition and a contact condition that states that calls received from a user's manager after business hours should be forwarded to the user's home number and an SMS message should be transmitted to the user's cellular phone.

If the call has no caller ID, the caller ID doesn't match a contact, or no rule is associated with a matching contact, method 400 may advance to stage 440 where computing device 500 may determine whether a current time is within a time interval condition of one of the rules. For example, messaging server 140 may determine that a call received at 1:16 PM falls within the user's working hours interval, and a rule comprises that interval as a condition. If the time of the call matches the time interval condition, method 400 may advance to stage 435 where computing device 500 may process the call according to the action associated with the rule.

Otherwise, method 400 may advance to stage 445 where computing device 500 may determine whether one of the rules comprises the availability of the user as a condition. For example, a rule may comprise forwarding incoming calls to a user's assistant when the user is attending a particular meeting or whenever the user's calendar indicates that the user is busy.

If so, method 400 may advance to stage 450 where computing device 500 may derive the user's current availability from the user's calendar. For example, messaging server 140 may retrieve the user's availability from a calendar application executing on user client 160. If so, method 400 may advance to stage 435 where computing device 500 may process the call according to the action associated with the rule. For example, if the user is determined to be available, the call may be forwarded to the user's cell phone, while if the user is not available, the call may be forwarded to voice mail.

If the availability of the user is not a condition for any rules, method 400 may advance to stage 455 where computing device 500 may determine whether the work status of the user is a condition for a rule. If so, method 400 may advance to stage 460 where the user's work status may be derived. For example, messaging server 140 may determine whether an e-mail application associated with the user is currently set to respond with an automatic message and the call may be processed accordingly. The e-mail application setting may be stored, for example, on server 150 and/or user client 160. Method 400 may advance to stage 435 where computing device 500 may process the call according to the action associated with the rule.

If no rule conditions match information associated with the incoming call, method 400 may advance to stage 465 where computing device 500 may process the call according to a default behavior. For example, messaging server 140 may forward the incoming call to a voice mail message box associated with the user. Method 400 may then end at stage 470.

Consistent with embodiments of the invention, the determinations of matching rule conditions may be performed in a user configurable order. For example, a user may set a rule comprising their availability as a condition, such as that described with respect to stage 445, should be evaluated prior to determining whether caller ID associated with the incoming call matches a contact-based rule, as described with respect to stages 420, 425, and 430. Once computing device 500 processes the call in stage 435 or stage 465, method 400 may then end at stage 470.

An embodiment consistent with the invention may comprise a system for providing call-handling rules. The system may comprise a memory storage and a processing unit coupled to the memory storage. The processing unit may be operative to retrieve user information, create a rule to be applied to incoming calls according to the user information, receive an incoming call, and process the at least one incoming call according to the created rule. The user information may comprise, for example, information retrieved from a user's calendar and/or e-mail application, the user's e-mail configuration (e.g., whether an auto reply feature is enabled or disabled), a company directory, and the user's contact list. Information derived from access to the user's information may be used as rule conditions, such as where a user's availability and/or working hours are derived from the user's calendar. The incoming call may be evaluated according to the user information (e.g., the rule may comprise routing the call to another user when the user is unavailable according to the user's calendar). Processing the incoming call may comprise, for example, forwarding the at least one incoming call to a phone number associated with the user, redirecting the at least one incoming call to a voicemail service, responding to the at least one incoming call with a pre-recorded message, and transmitting a message to the user. The incoming call may be processed according to caller ID information associated with the call, such as by identifying one of the user's contacts as the caller.

Another embodiment consistent with the invention may comprise a system for providing call-handling rules. The system may comprise a memory storage and a processing unit coupled to the memory storage. The processing unit may be operative to access a plurality of information associated with a user, provide a user interface operative to create a plurality of rules, receive an incoming call intended for the user, and process the incoming call according to at least one of the plurality of rules.

Yet another embodiment consistent with the invention may comprise a system for providing call-handling rules. The system may comprise a memory storage and a processing unit coupled to the memory storage. The processing unit may be operative to retrieve an activity from a calendar associated with a user and derive an availability of the user from the activity, retrieve contacts from the user's contact list, derive a work status associated with the user according to an e-mail automatic reply state associated with the user, and create call-handling rules according to conditions such as the availability of the user, a time interval, the plurality of contacts, and the work status of the user. The processing unit may be further operative to receive an incoming call intended for the user, retrieve the rules from a memory storage associated with the user (e.g., the user's e-mail mailbox), and determine whether the incoming call comprises a caller ID. If so, and if the caller ID corresponds to at least one of the user's contacts, the call may be processed according to a rule associated with that contact. Otherwise, the processing unit may be operative to determine whether a current time is within a time interval condition of one of the rules. If so, the call may be processed according to that rule. If not, the processing unit may be operative to determine whether one of the rules comprises the availability of the user as a condition. If so, the user's current availability may be derived from the user's calendar, and the call may be processed accordingly. If the availability of the user is not a condition, the processing unit may be operative to determine whether the work status of the user is a condition for a rule. If so, the user's work status may be derived by determining whether an e-mail application associated with the user is currently set to respond with an automatic message and the call may be processed accordingly.

Figure 5:
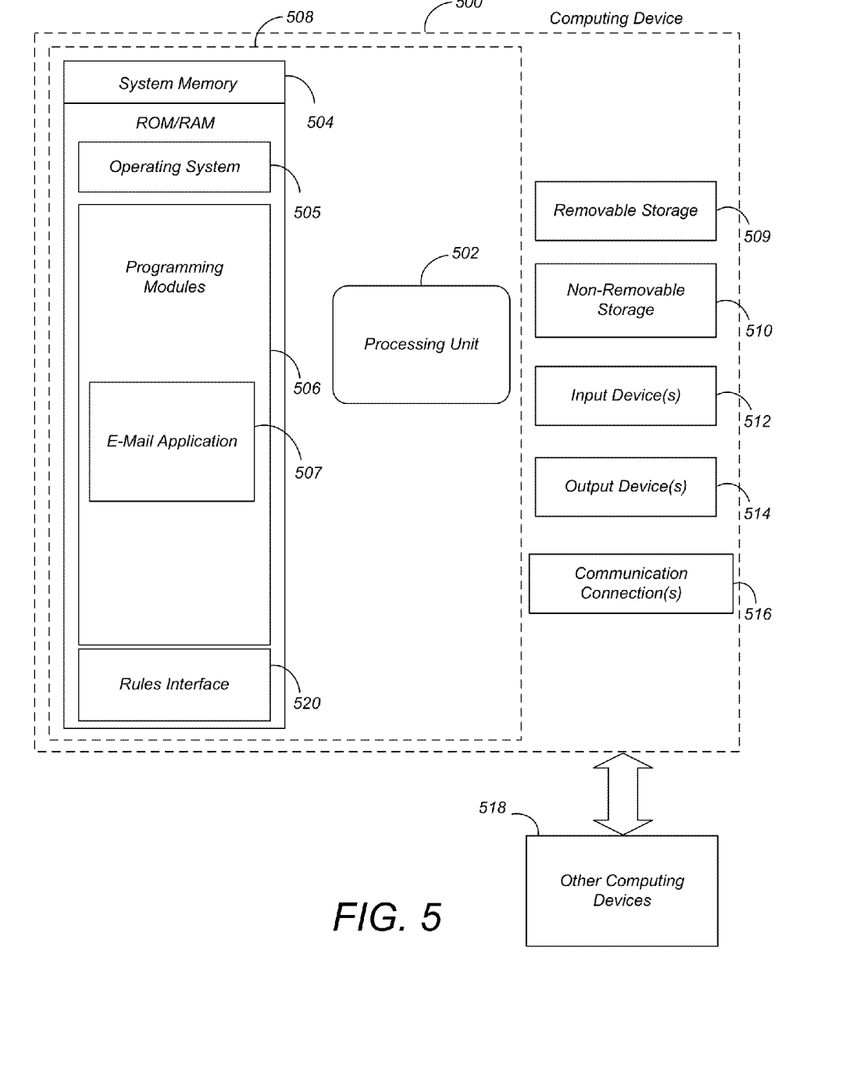
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for system 100 as described above. System 100 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include an e-mail application 507. Operating system 505, for example, may be suitable for controlling computing device 500's operation. In one embodiment, programming modules 506 may include rules interface 520. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. rules interface 520) may perform processes including, for example, one or more of method 300's and/or method 400's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing call-handling rules, the method comprising:
   retrieving a plurality of user information;
   creating a rule to be applied to at least one incoming call according to an element of the plurality of user information, the rule being based at least in part on whether an automatic e-mail reply setting is enabled for automatically responding to incoming email messages;
   receiving the at least one incoming call;
   determining whether the at least one incoming call includes a caller id matching a contact;
   determining whether a contact-based rule associated with the contact is enabled; and
   when the contact-based rule is not enabled, if the automatic email reply message is enabled, processing the at least one incoming call according to the created rule, wherein the call is redirected to another user or service.

2. The method of claim 1, wherein processing the at least one incoming call comprises evaluating at least one element of the plurality of user information.

3. The method of claim 1, wherein the plurality of user information is retrieved from at least one of the following: a calendar, an e-mail application, an e-mail configuration, a company directory, and a contact list.

4. The method of claim 1, wherein the created rule comprises an availability of the user according to the element of the plurality of user information.

5. The method of claim 1, wherein processing the at least one incoming call comprises at least one of the following: forwarding the at least one incoming call to a phone number associated with the user, redirecting the at least one incoming call to a voicemail service, responding to the at least one incoming call with a pre-recorded message, and transmitting a message to the user.

6. The method of claim 1, further comprising:
   when the contact-based rule is enabled, processing the at least one incoming call according to the contact-based rule and the received element of Caller ID information.

7. The method of claim 1, wherein the created rule comprises a working hours condition.

8. The method of claim 7, wherein the working hours condition is derived from a calendar application associated with the user.

9. A system for providing call-handling rules, the system comprising:
   a memory storage; and
   a processing unit coupled to the memory storage, wherein the processing unit is operative to:
      access a plurality of information associated with a user, the plurality of information comprising an automatic e-mail reply setting for the user,
      provide a user interface operative to create a plurality of rules to be applied to an incoming call according to the user information, at least one of the plurality of rules being based on whether the automatic e-mail reply setting is enabled for automatically responding to incoming email messages,
      receive the incoming call intended for the user;
      determining whether the incoming call includes a caller id matching a contact;
      determining whether a contact-based rule associated with the contact is enabled; and
      when the contact-based rule is not enabled, if the automatic email reply message is enabled, process the incoming call according to at least one of the plurality of rules, wherein the call is redirected to another user or service.

10. The system of claim 9, wherein the processing unit is further operative to:
   determine whether none of the plurality of rules comprises a condition matching the incoming call; and
   in response to determining that none of the plurality of rules comprises a condition matching the incoming call, process the incoming call according to a default rule.

11. The system of claim 9, wherein the processing unit is operative to process the incoming call according to the created rule only after a busy signal is received from a primary number associated with the user.

12. The system of claim 9, wherein the processing unit is further operative to:
   set a priority associated with each of the plurality of rules; and
   process the incoming call according to a highest priority rule of the plurality of rules with a rule conditions matching the incoming call.

13. The system of claim 12, wherein the priority associated with at least one of the plurality of rules is received from the user via the provided user interface.

14. The system of claim 9, wherein the provided user interface is operative to retrieve the plurality of information associated with the user from a plurality of software applications.

15. The system of claim 9, wherein the processing unit is further operative to:
   determine whether the at least one of the plurality of rules comprises an availability of the user as a condition;
   in response to determining that the at least one of the plurality of rules comprises the availability of the user as the condition, retrieve the availability of the user from a calendar application; and
   process the incoming call based on the retrieved availability of the user.

16. The system of claim 9, wherein the plurality of information associated with the user comprises at least one of the following: an availability of the user according to a calendar application, an availability of the user according to a messaging application, a working hours time interval, a contact list according to an e-mail application, a company directory, and an e-mail reply setting.

17. The system of claim 9, wherein the plurality of rules are stored in a mailbox associated with an e-mail application associated with the user.

18. A method for providing call-handling rules, comprising:
   receiving user information;
   creating a call-handling rule to be applied to an incoming call according to the user information, the call-handling rule defining a call handling action for the incoming call;
   receiving a selection to enable or disable an automatic email reply message for responding to incoming email messages;
   receiving the incoming call;
   determining whether the incoming call includes a caller id matching a contact;
   determining whether a contact-based rule associated with the contact is enabled; and
   when the contact-based rule is not enabled, determining whether the automatic email reply message is enabled; and
   if the automatic email reply message is enabled, then processing the incoming call according to the call handling rule, wherein the call is redirected to another user or service.

19. The method of claim 18, wherein the call-handling rule comprises a working hours condition.

20. The method of claim 18, wherein the working hours condition is derived from a calendar application associated with the user.

21. The method of claim 18, wherein processing the incoming call comprises at least one of the following: forwarding the incoming call to a phone number associated with the user, redirecting the incoming call to a voicemail service, responding to the incoming call with a pre-recorded message, and transmitting a message to the user.

* * * * *